United States Patent [19]

Humphreys, Jr. et al.

[11] Patent Number: 4,843,324
[45] Date of Patent: Jun. 27, 1989

[54] APPARATUS FOR DETERMINING THE LOCATION AND DISTANCE TO A CONCEALED CONDUCTIVE STRUCTURE

[75] Inventors: Thomas G. Humphreys, Jr.; George G. Plosser; Michael D. Ryan, Jr., all of Birmingham, Ala.

[73] Assignee: R. Donald Plosser, Birmingham, Ala.

[21] Appl. No.: 181,442

[22] Filed: Apr. 14, 1988

Related U.S. Application Data

[63] Continuation-in-part of Ser. No. 806,545, Dec. 9, 1985, abandoned.

[51] Int. Cl.$^4$ .............................................. G01V 3/08
[52] U.S. Cl. ..................................... 324/326; 324/67
[58] Field of Search ............... 324/67, 326, 327–329, 324/66, 330, 331, 345, 207, 208, 263, 501, 520, 521, 527, 528–531

[56] References Cited

U.S. PATENT DOCUMENTS

| | | | |
|---|---|---|---|
| 3,418,572 | 12/1968 | Humphreys, Jr. | 324/67 |
| 3,893,025 | 7/1975 | Humphreys, Jr. | 324/326 |
| 4,044,299 | 8/1977 | Weber | 324/326 |
| 4,147,973 | 4/1979 | Weber | 324/326 |
| 4,161,686 | 7/1979 | Weber | 324/326 |
| 4,387,340 | 6/1983 | Peterman | 324/326 |
| 4,520,317 | 5/1985 | Peterman | 324/326 |
| 4,542,349 | 9/1985 | Darilek et al. | 324/326 |

Primary Examiner—Reinhard J. Eisenzopf
Assistant Examiner—Warren S. Edmonds
Attorney, Agent, or Firm—C. A. Phillips

[57] ABSTRACT

A system for locating a buried structure in which a signal radiating from the structure is measured by its reception on the surface of the earth with the signal being attenuated by a selected amount and then measured by reception at varying distances above the earth with a lesser attenaution, whereby the depth of the object below ground is indicated as a function of signal level differences and attenuation.

23 Claims, 6 Drawing Sheets

APPARATUS FOR DETERMINING THE LOCATION AND DISTANCE TO A CONCEALED CONDUCTIVE STRUCTURE

CROSS-REFERENCE TO RELATED APPLICATIONS

This application is a continuation-in-part of patent application Ser. No. 06/806,545, filed Dec. 9, 1985.

BACKGROUND OF THE INVENTION

1. Field of the Invention

This invention relates generally to devices which detect a buried or concealed conductive structure, and particularly to one which enables the determination of its depth or interruptions in it.

2. Background of the Invention

There currently exist, and are commonly used, many electronic devices for locating diverse buried or concealed power cables, telephone cables, television cables, and numerous other structures. Virtually all such locators employ the principle of injecting, by direct connection or by induction, an alternating current of relatively high frequency into the structure to be traced and then following the course of the radiated signal from the structure with a suitable receiver containing an indicating means, such as a loudspeaker, meter, digital display, or other device. One such device, the Pipehorn TM, is manufactured and sold under U.S. Pat. No. 3,418,572, issued Dec. 24, 1968.

In addition, there now exists a number of devices particularly intended to determine the depth or distance to such concealed structures. Most such new devices, including one disclosed in U.S. Pat. No. 3,893,025, issued July 1, 1975, employ two vertically displaced antennas and measure depth and utilize the difference in the signal level detected by the two antennas and relate the difference, mathematically, to the distances involved. Actual readings are generally from a scale on a potentiometer, sound nulls, or by digital display. Unfortunately, the usefulness and accuracy of such devices is constantly being eroded by the installation of greater numbers of energy delivery systems, communication cables, lighting system cables, and other diverse structures, most of which are conductive. As a result, the applicants have concluded that as a practical manner, the readings from two antenna systems lack sufficient accuracy for serious usage for determining the depth of a conductive structure.

In addition to the problem of the determination of the depth of a conductive structure, there exists a second problem related to buried conductive structures, and that arises with respect to ferrous pipe carrying natural or manufactured gas or other combustible hydrocarbons, such as gasoline or propane or any other hazardous material, as these structures are required to be cathodically protected by application of a direct current such that electrical current will flow from soil around the pipe to the pipe and thus mitigating, preventing, opposite directional flow and thus electrolytic corrosion of the pipe. For many years, the most common method of supplying such current has been to utilize power from electric utilities and suitable transformers and rectifiers to provide the direct current at suitable voltage and current levels to sustain the desired potentials over the run of the pipe. In order to minimize potentially destructive stray currents or on other structures, many owners of such systems are now using a "distributed ground bed" technique wherein anodes are installed at spaced intervals along and adjacent to the pipe to be protected, with a continuous insulated cable connecting the anodes. With such a system, it is extremely important to determine the location and condition of the anodes and connecting cables. It is also extremely important to be able to trace the flow of the current in the various structures and to determine its relative magnitude at specific points in order to locate defects in the system, particularly breaks or short circuits which will prevent continuous coverage.

As far as is known by the applicants, the only effective and practical way of testing a cathodic protection system is simply the direct one of actually measuring the potential on elements of the system with respect to surrounding earth. This, of course, means that one has to do a tremendous amount of digging, and thus it is apparent that there is a substantial need for a system which will enable above-ground survey and location of defects in such a system.

Accordingly, it is the object of this invention to provide an above-ground, conductive-structure locating device which, after generally locating the region in which such a structure lies, will accurately indicate its depth, and where required, determine the location of defects.

Summary of the Invention

In accordance with a basic feature of this invention, a single antenna receiver for reception on at least one selected frequency is constructed to include a signal attenuator with at least one identifiable attenuation state. It is adapted to be initially operated with a selected attenuation level in place, and the resulting signal level is detected with the antenna of the receiver resting on earth or other surface overlying a buried or concealed structure. Then, the attenuation would be switched off in the receiver and the receiver antenna raised above the surface until the detected signal returns to the original or selected proportion of the level detected with the antenna on the surface and with the attenuation in place. The height of the antenna required to achieve signal balance or signal level proportion will then be a known function of the attenuation employed and the distance from this surface down to the buried structure. If the attenuation was set at 6 db, then the distance down to the structure will be equal to the height above ground of the raised antenna. The accuracy of this measurement may be readily checked by moving the antenna outward from the point just above the underground structure a measured distance and measuring the level at this point and then moving the antenna a like distance on the opposite side of a point just above the underground structure and comparing the signal levels; they should be the same. This thus provides a verification of results. This is not possible with a two-antenna system.

As a further, feature of this invention, a receiver is included which is tuned to the ripple frequency of a cathodic protection system, typically 120 pulses per second (PPS) D.C. Commonly, there is also provided means of attenuating this signal by a selected factor, and thus depth detection will work in the same manner as described.

As still a further feature of this invention, additional attenuation factors are incorporated, typically providing stepped attenuations extending below 6 db. These are of particular value in fault locations in cathodic protection systems, first employing maximum attenuation to roughly determine the location of break, and then graduating through lower attenuation settings for finer resolution, as will be further described.

DESCRIPTION OF THE PREFERRED EMBODIMENT

Figure 5:
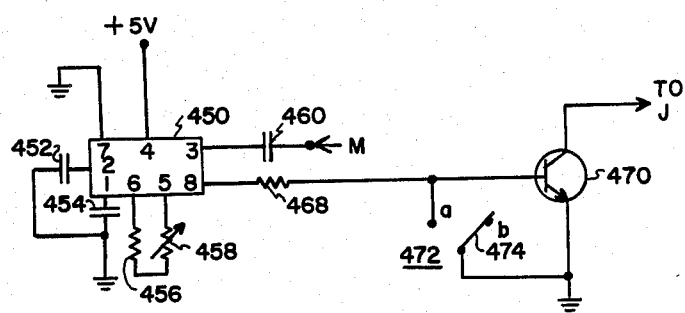
FIG. 5 is an electrical schematic diagram of an alternate for a portion of the system shown in FIG. 1b.
Figure 6:
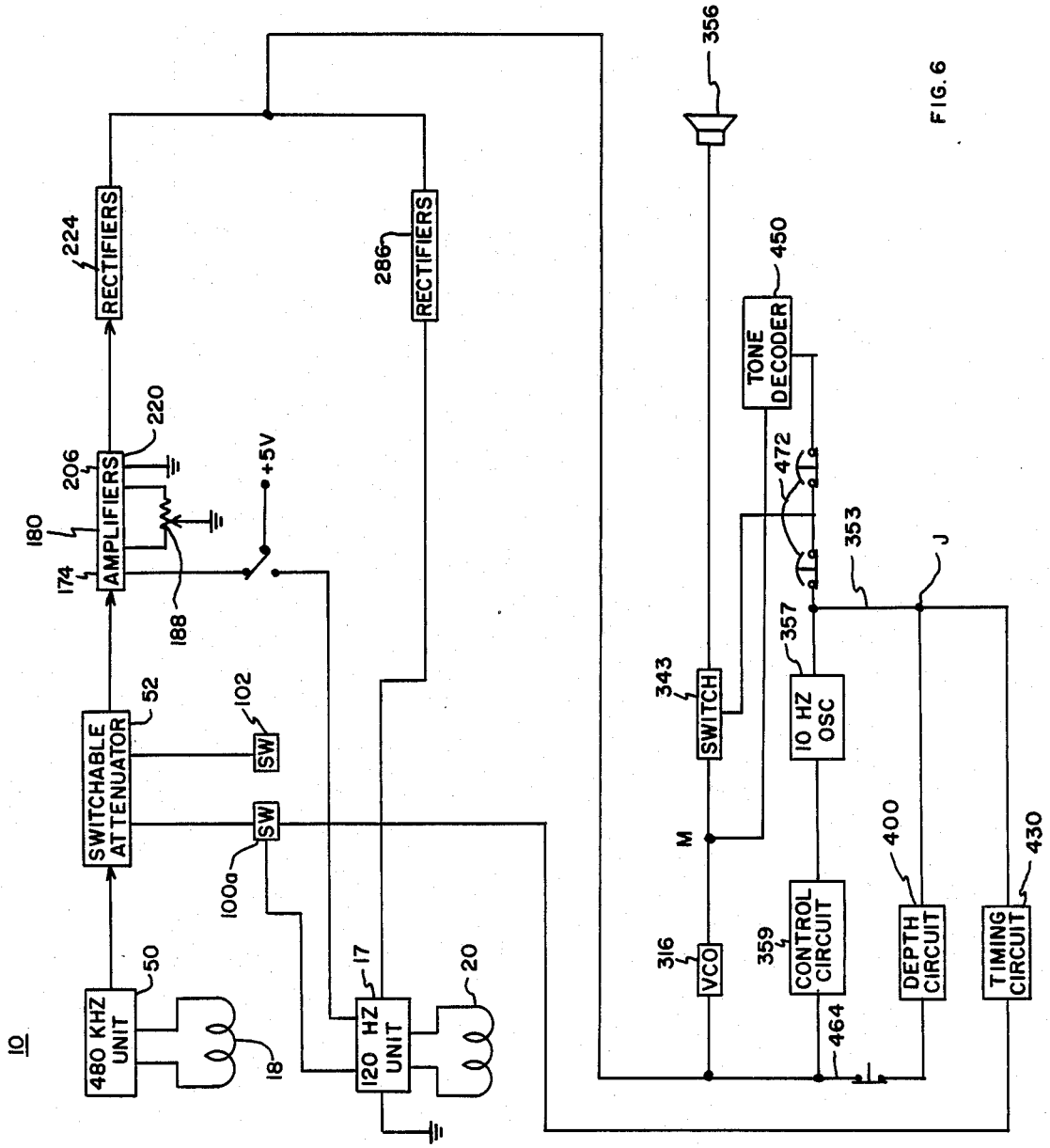
FIG. 6 is an electrical block diagram of FIGS. 1a–1d.

FIG. 6 illustrates a summary of applicants' system as particularly illustrated in FIGS. 1a, 1b, 1c, 1d, and 5. Basically, there are shown two detection systems, one operating at 480 KHz and the other at 120 Hz as particularly illustrated by 480 KHz pickup coil 18 as a circuit input and by 120 Hz pickup coil 20. The 480 KHz circuit is generally employed in object location and the 120 Hz circuit where the interruption of cathodic circuits are being detected.

Examining first the 480 KHz system, a 480 KHz signal is picked up from a concealed conductive structure which has been otherwise impressed with a 480 KHz signal, and the output of this unit is passed through switchable attenuator 52 (FIG. 1a); then the signal is amplified by amplifiers 174, 180, 206 (FIG. 1b), after which its output is rectified by rectifier 224. This rectified voltage is then provided as an input (F) to audio frequency voltage controlled oscillator (VCO) 316 (FIG. 1c). The frequency of VCO 316 varies inversely with input voltage and provides an output audio frequency signal at point 332 (M). Switch 343 (FIG. 1d) enables the signal to be reproduced by loudspeaker 356 under certain conditions and cut off under certain other conditions as are explained.

In operation as a depth locator, coil 18 is placed on a surface concealing a structure which has been otherwise impressed with a 480 KHz signal. Attenuator 52 and potentiometer 188 are adjusted such that the voltage input to voltage controlled oscillator 316 produces, through switch 343, a mid-point range audio signal. This is reproduced by loudspeaker 356. At the same time, the voltage producing this is stored on a capacitor in depth circuit 400. Then, next, attenuator 52 is operated to remove 6 db of attenuation which increases the signal by this quantity, causing the voltage F to rise and causing VCO 316 to provide a decrease in frequency being reproduced by loudspeaker 356. At the same time an operator would raise coil 18 away from the surface, this will cause the received voltage and thus the voltage on F to decrease. Control circuit 359 has a comparator which compares the original stored voltage with the new voltage, and when the two are equal, depth circuit 400 puts out a voltage through switch 472, as shown, to switch 343 which then cuts off sound to speaker 356, indicating to the operator that at this distance above the concealed surface, for example, ground, the desired object is at an equal distance below the surface.

In order to prevent signal overloading of circuitry, control circuit 359 detects when signal F is too high for the circuitry to handle, and then there is provided a signal output which operates 10 Hz oscillator 357 which then operates switch 343 at a 10 Hz rate which provides a like modulation of the audible signal on speaker 356. Thus, an operator is informed that he should reduce the setting of potentiometer 188 to reduce the signal F to a workable range.

In addition, there is provided a timing circuit 430 which, in the event that too much time is taken between obtaining an original sample and final operation, to also provide a signal on lead J which will cut off switch 343, indicating that operation should be started over.

The circuitry just described is also responsive to 120 Hz unit 17.

As an alternate mode of depth detection, tone decoder 450 is fed a reference signal M from the output of VCO 316 with the sensing coil 18 on a surface and tone decoder 450 adjusted to be receptive to this signal and provide an output. Then, the procedure just described is gone through which will cause the frequency of signal M to (move) rise in frequency, and when the frequency of M equals the original reference frequency which tone decoder is adjusted to receive, it will provide an output through switch 472 to switch 343 which will turn off sound to speaker 356 and thus indicate that coil 18 has been raised from a surface a distance equal to the distance of the concealed object below the surface.

Figure 1A:
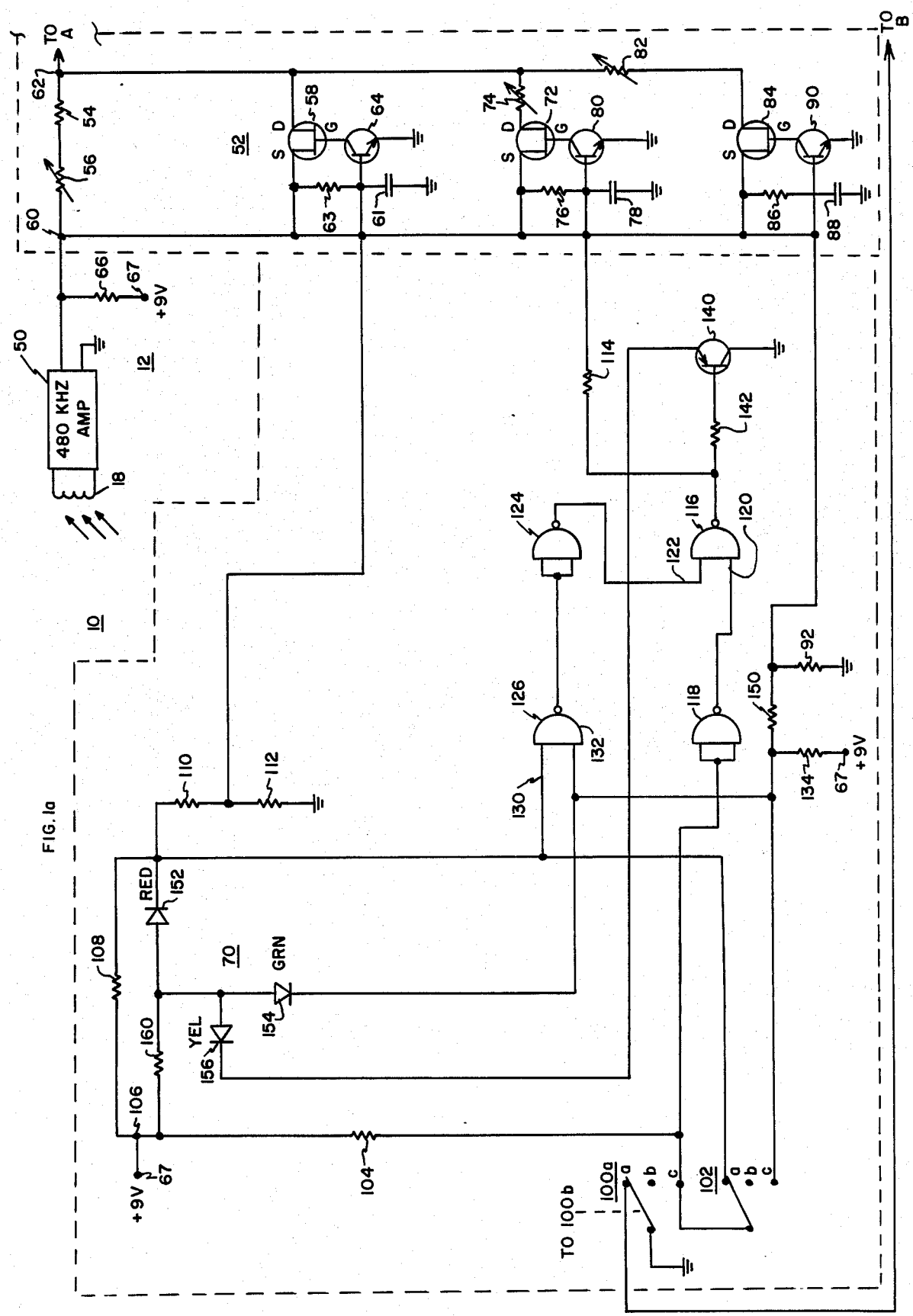
FIGS. 1a, 1b, 1c, and 1d form an electrical schematic diagram of the basic system of this invention.
Figure 1B:
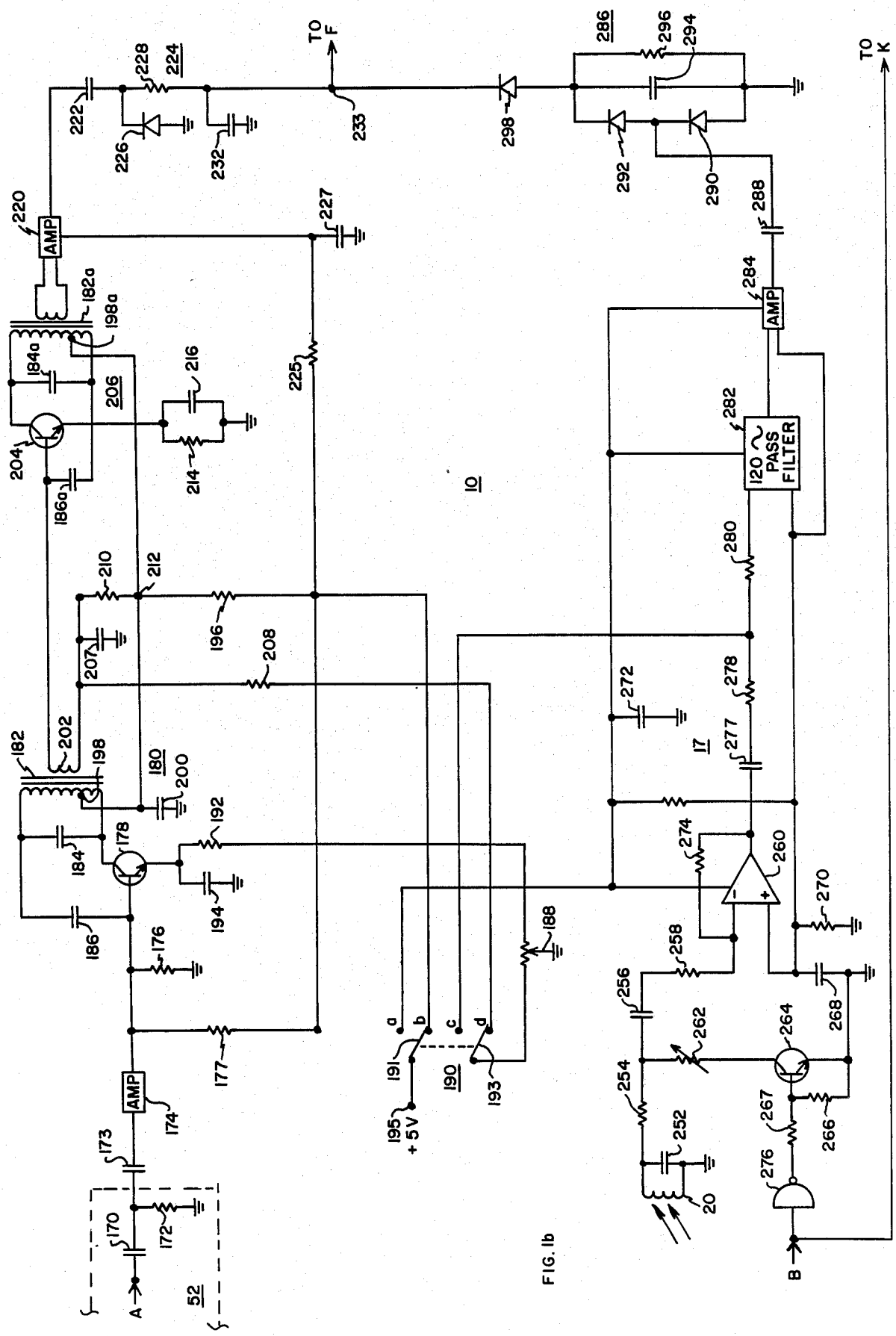
Figure 1C:
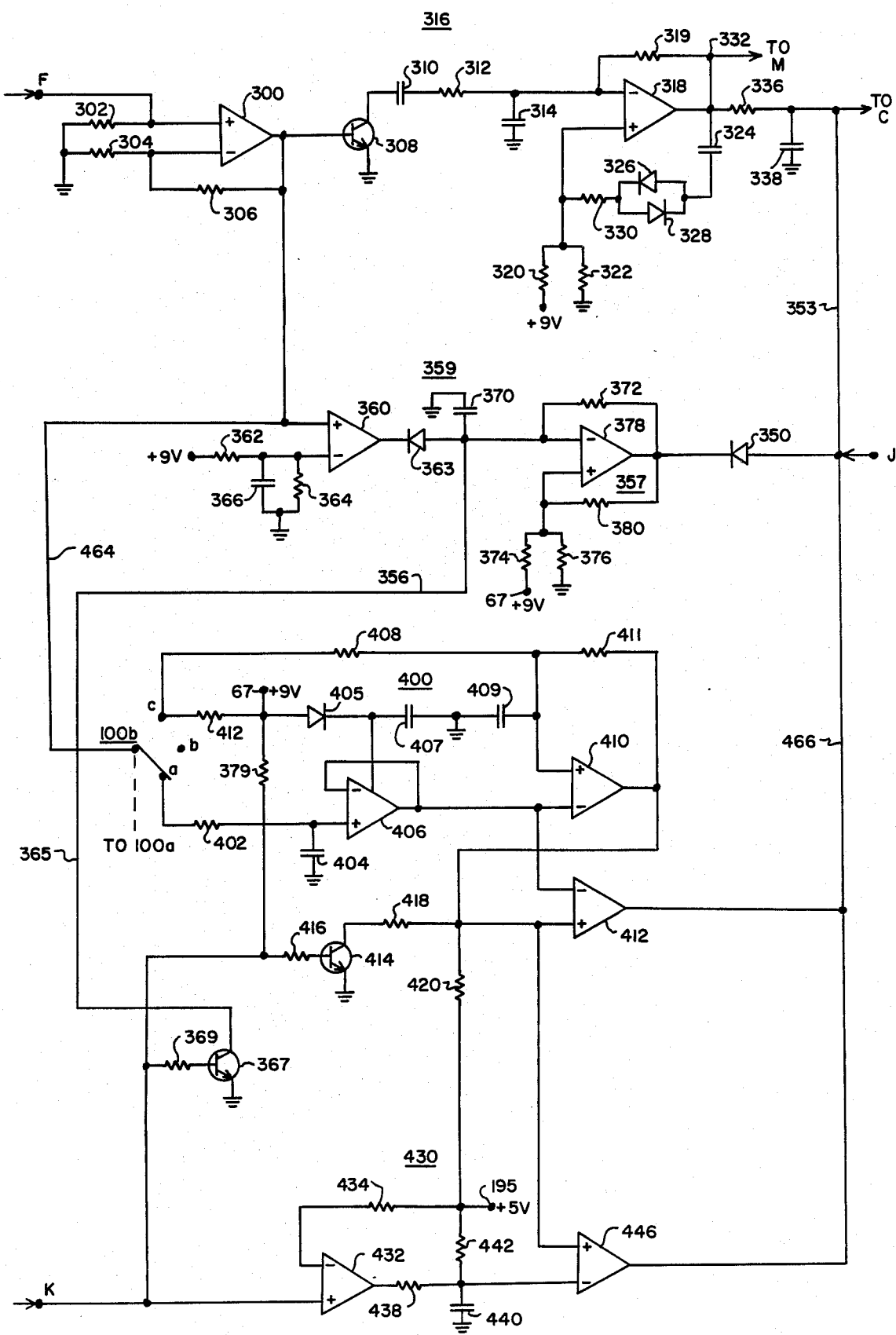
Figure 1D:
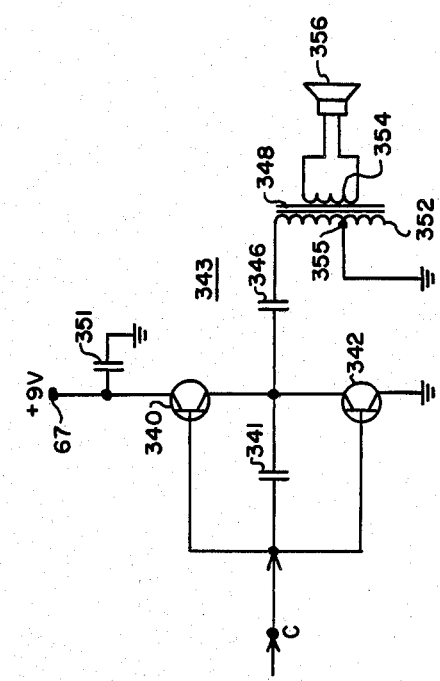

Receiver 10, shown in block diagram form in FIG. 6 and schematically in FIGS. 1a and 1b, employs a 480 KHz sensor 12 and 120 Hz sensor 14. Actually, there are separate receiving units, 480 KHz unit 12 and 120 Hz unit 17. Both are housed in a basic housing 16 with discrete 480 KHz antenna 18 and 120 Hz sensing coil 20 located in an antenna coil housing region 22 mounted on extension 24 as shown in FIGS. 2 and 3.

Figure 2:
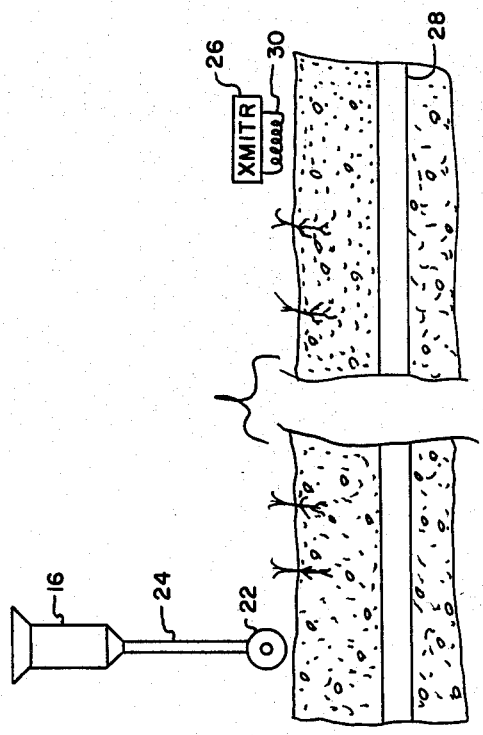
FIG. 2 is a diagrammatic illustration of the employment of the invention in an initial depth measurement mode.
Figure 3:
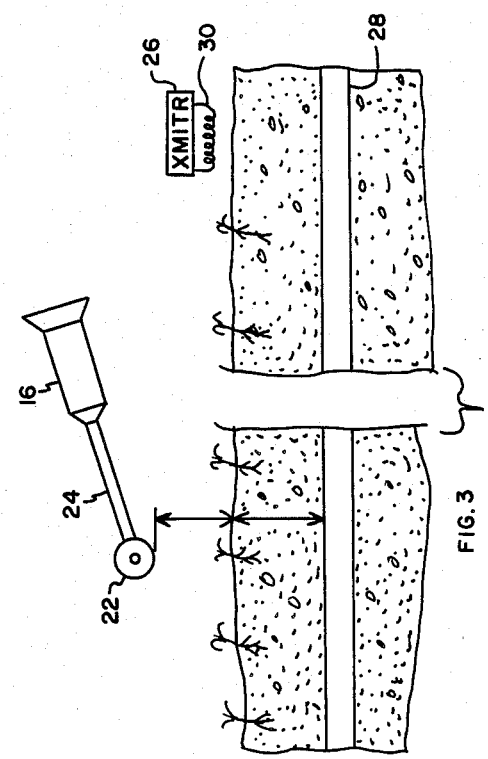
FIG. 3 is a diagrammatic illustration of the employment of the invention in a final depth measurement mode.

FIGS. 2 and 3 generally illustrate applicants' system and wherein a 480 KHz signal is generated by transmitter 26 and induced into a buried or concealed structure, such as pipe 28 by transmitting antenna coil 30 at a known location of the structure. Alternately, transmitter 26 would include means for directly connecting the transmitter output to a pipe 28.

Figure 4:
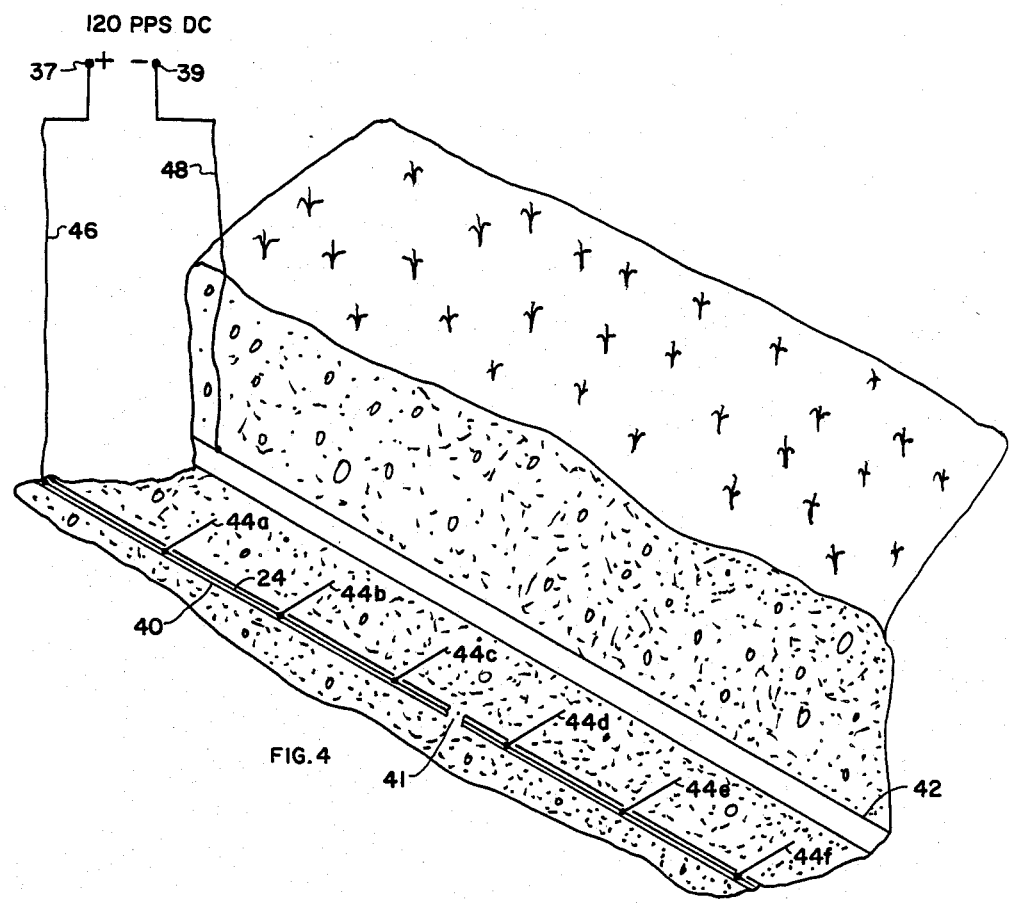
FIG. 4 is a diagrammatic illustration of the arrangement of a cathodic protection system for the protection of buried pipes, such as gas pipes. The present invention includes particular means for detecting breaks in such a system.

Signals of 120 Hz are present along certain pipelines, notably gas pipelines, by the placement of an electrical conductor 40 along the pipeline, such as conductor 24 along pipeline 42, as shown in FIG. 4. Conductor 40 is an insulated conductor but it has connected to it a series of spaced, bare anodes 44. A D.C. signal having a 120 PPS ripple is applied to terminals 37 and 39 through coupling lines 46 and 48 between pipeline 42 and conductor 40, and thus current is caused to flow from the anodes 44 to the pipe, which thus becomes a cathode. This prevents reverse electrical fields from occurring and the deterioration of the pipeline which might otherwise occur. Receiver 10 detects the presence of fields generated by the flow of the 120 PPS component of current, and thus the detection of the loss of same provides an indication of a break in the system such as in conductive line 40.

Antenna coil 18 senses a 480 KHz signal, as from the set-up shown in FIG. 2, and its output is amplified by 480 KHz amplifier 50 (FIGS. 1a); then the output is passed through attenuator 52, which has four selective stages of attenuation.

The first stage of attenuator 52 consists simply of a combination of fixed resistor 54, variable resistor 56, and resistor 172 (FIG. 1b). Resistor 56 would be adjusted to provide a combined attenuation of 6 db.

The second stage of attenuator 52 employs field effect transistor 58 which, as shown, has its S (source) and D (drain) leads connected to attenuator input and output terminals 60 and 62, and thus when activated with a high signal on its G (gate) electrode, effects a short between terminals 60 and 62, and thus attenuation across attenuator 52 is reduced to zero (resistor 172 remains in circuit). The S and G electrodes of field effect transistor 58 are connected by resistor 63, and a capacitor 61 connects between the G electrode and ground. Transistor 58 is switched by NPN transistor 64 with its emitter grounded and its collector connected to the G electrode of transistor 58. Operating bias for transistors 58 and 64 is provided from a +9 volt terminal 67 through resistor 66. The base of transistor 64 is selectively biased high or low by a control bias to effect control of transistor 58 by attenuator control circuit 70.

The third stage of attenuator 52 employs field effect transistor 72 which is operated to introduce shunt resistor 74 which, together with resistors 54, 56, and 172, will produce a net 3 db attenuation between terminals 60 and 62. Variable resistor 74 is connected in series with the S and D terminals of transistor 72 to attenuator terminals 60 and 62. A resistor 76 connects between the S and G terminals of a transistor 72, and capacitor 78 connects between the G terminal of transistor 72 and ground. Bias to the collector of transistor 80 also is fed through resistor 76. Operating bias for transistor 72 is provided from +9 volt terminal 67 through resistor 66. Transistor 80 controls transistor 72, the emitter of transistor 80 being connected to ground. The base of transistor 80 is connected to control circuit 70 and is operated on and off, as will be described, in order to selectively effect 3 db attenuation.

The fourth stage of attenuator 52 includes variable resistor 82 which is switched between attenuator terminal 60 and 62 by field effect transistor 84, variable resistor 82 generally being adjusted to provide a net 5 db attenuation when transistor 84 is turned on and thus when resistor 82 is connected in parallel with serially connected resistor 54 and 56. Resistor 86 connects between the S and G terminals of transistor 84, and capacitor 88 is connected between the G terminals of transistor 84 and ground. Transistor 90, which controls transistor 84, obtains collector bias through resistor 66 and resistor 86. The base of transistor 90 is selectively biased high or low to effect control of transistor 90 and therefrom transistor 84. The selective bias is obtained as a control voltage across resistor 92 connected between the base of transistor 90 and ground is provided by control circuit 70, as will now be described.

Control circuit 70 is manually controlled by selector switches 100a (ganged with 100b) and 102. Together these switches determine whether or not a high or low signal will be placed on the base input of control transistor 64, 80, or 90. With switches 100a and 102 in the position shown, the a terminal of switch 102 is biased high through resistor 104 by the indicated +9 volt bias on terminal 67. The high bias is also available through resistor 108 to transistor 64, in both instances it being applied across resistors 110 and 112. With this posture, transistor 64 is turned on, providing a low input to transistor 58, leaving its output open and thus providing no attenuation effect between terminals 60 and 62.

At the same time, transistor 80 is controlled through resistor 114 by the output of NAND gate 116 which is high, turning transistor 80 on and thus providing a low controlled input to transistor 72, and thus its attenuating resistor 74 is not in circuit. NAND gate 116 is controlled to provide a high output as follows. One input for NAND gate 116 is provided by NAND gate 118 connected as an inverter to thus provide a low input at terminal 120. The other input, at terminal 122, is provided through NAND gate 124 connected as an inverter from NAND gate 126, and both input terminals 130 and 132 of NAND gate 126 are high as they are connected to +9 volt terminal 67 through resistors 108 and 134, respectively. Thus, the output of NAND gate 126 is low, causing the output of NAND gate 124 to be high on terminal 122 of NAND gate 116 and thus with a low on terminal 120 as described, the output of NAND gate 116 is high, turning on transistor 80 and thereby turning off transistor 72. At the same time, the output of NAND gate 116 provides, through resistor 142, a high input to the base of transistor 140 which will hold it off. It operates to effect yellow LED 156, holding it off. Finally, as to the operation of the attenuator, a high state is applied through resistor 134, resistor 150 and across resistor 92 to the base input of transistor 90, which applies a low or turn-off state to the input of transistor 84, which opens the circuit through 5 db resistor 82. Thus, with transistor 58, 72, and 84 open, the only attenuation is that effected by the 6 db circuit consisting of resistor 56, 54, and 172.

Three indicator lights, LED 152 (also designated red), LED 154 (also designated green), and LED 156 (also designated yellow) providing a signalling as to the state of attenuator 52. With the basic attenuation in place as just described, 6 db attenuation, none of the signal lights are operable, this being the general search mode.

Next, it will be assumed that it is desired to effect a 0 db attenuation, and this we do by moving switch 100a to the c position. This pulls down the voltage on c and thereby the base of transistor 64 to a low state, causing transistor 58 to turn on and effectively short out all resistance between attenuator terminals 60 and 62. Thus, we have achieved a reduction in attenuation by 6 db. This state is indicated by a turning on of red indicating LED 152, this occurring as the negative terminal of LED 152 is grounded through switch 102 completing a bias circuit through resistor 160 to plus bias terminal 67.

It will next be presumed that it is desired to introduce the 3 db attenuation between terminals 60 and 62, and this is accomplished by moving switch 102 to the b position. First, in this state, it will be noted that positive bias is reapplied to the base input of transistor 64, causing transistor 58 to turn off and hold off red LED 152. At the same time, both inputs to NAND gate 126 go high, providing a low input to inverter connected NAND gate 124, which causes it to provide a high input to input 122 of NAND gate 116. At the same time, a low state is provided to the input of inverter connected NAND gate 118 which provides a high input to the second input, input 120 of NAND gate 116, which now causes the output of this NAND gate to go low. This does two things. First, it causes transistor 80 to turn off and turn on transistor 72 inserting the 3 db effect provided by resistor 74. Second, the low output of NAND gate 116 is applied to the base input of transistor 140 which causes transistor 140 to turn on, enabling yellow LED 156 to turn on, marking the 3 db state. Since terminal c of switch 102 remains high, transistor 90 remains on and transistor 84 remains open, thus resistor 82 remains out of the circuit, leaving only 3 db attenuation resistor 74. Also, with terminal c of switch 102 high, green LED 154 remains off, leaving on only yellow LED 156.

Next, it will be presumed that it is desired to introduce the 5 db attenuator, and this is accomplished by moving the movable contact of switch 102 to the c position. In this position, the base input to transistor 64 remains high, keeping transistor 58 off and likewise red LED 152 off. With terminal c of switch 102 now at 0 state, terminal 132 of NAND gate 126 goes low, and its output goes high and the output of inverter connected NAND gate 124 goes low, causing the output of NAND gate 116 to go high and transistor 80 to turn on, thereby turning off transistor 72 and opening the circuit through 3 db resistor 74. At the same time, the high output of NAND gate 116 turns off transistor 140 and thus turns off yellow LED 156. Finally, with a 0 state from terminal c of switch 102 applied to the base input of transistor 90, it is turned off and transistor 84 turned on to close the circuit through 5 db attenuating resistor 82 (accomplished in conjunction with resistors 54, 56, and 172) and thus placing this attenuator in circuit between terminals 60 and 62 of attenuator 52. At the same time, with a 0 state being placed on the negative terminal of green LED 154, it provides an indication that the 5 db attenuation is in effect. The use of the attenuator will be discussed later in conjunction with depth measurements.

The 480 KHz output signal of attenuator 52 is fed through capacitor 170 and across resistor 172 which terminates, and actually forms a part of, attenuator 52, as described. From resistor 172, the signal is applied through D.C. blocking capacitor 173 to amplifier 174. The amplified output of amplifier 174 is fed across resistor 176 to the base input on NPN transistor 178 of adjustable gain amplifier 180. An operating bias is applied to the base through resistor 177. Amplifier 180 is a tuned amplifier having a tuned output circuit consisting of transformer 182 and capacitor 184 and stabilized by feedback capacitor 186. Gain of 480 KHz receiving unit 15 is controlled by potentiometer 188, with switch 190 in the position shown wherein the variable resistance of potentiometer 188 is connected in series through resistor 192 with the emitter of transistor 178. Capacitor 194 provides signal filtering for the emitter circuit. Operating bias for amplifier 180 is provided through contact b of switch 190 from +5 volt terminal 195. It is fed through resistor 196 to a tap 198 on the primary of transformer 182 and therefore to the collector of transistor 178. The amplifier is tuned to 480 KHz by the combination of the inductance of transformer 182 and the capacitance of capacitor 184. Decoupling of applied bias is effected by capacitor 200.

The output of amplifier 180 is provided by the secondary 202 of transformer 182 and is applied to the base of NPN transistor 204 of a following amplifier 206, the lower side of secondary 202 being provided a signal ground through capacitor 207. The gain of amplifier 206 is also controlled by potentiometer 188, one end of which is connected through terminal d of switch 190 and then through resistor 208 and resistor 210 to bias terminal 212. By this arrangement, the bias on the base of transistor 204 is provided through secondary 202 of transformer 198 and is variable by adjustment of potentiometer 188 coordinate with its adjustment of the gain of amplifier 180. The emitter of transistor 204 is also provided a measured bias by the combination of resistor 214 and capacitor 216 connected in parallel between the emitter and ground.

The output circuit of amplifier 206 is identical with that of amplifier 180 and like components are identically labeled but with the suffix "a." Collector biasing is from terminal 212 to tap 198a on the primary of transformer 182a. The output of amplifier 206 is further amplified in amplifier 220. This amplifier is powered by a potential from switch 190 and through resistor 225, capacitor 227 filtering the power to the amplifier. The output of amplifier 220 is fed through capacitor 222 to rectifier circuit 224 which consists of a parallel connected diode 226 and series connected resistor 228. Parallel connected capacitor 232 filters the rectified signal which finally appears at terminal 233 and which represents, as a positive D.C. signal, the average amplitude of the rf signal sensed by antenna coil 18 as processed through the circuitry shown and described. The level of this signal is used, as will be further explained, to determine the location and depth of a buried or concealed metal structure utilizing the 480 KHz signal remotely applied to it as shown.

A second receiving unit, 120 Hz receiving unit 17, is alternately used in the present system, and it, too, provides a rectified positive signal to point 233 which is representative of the level of a received signal, in this case, representative of the 120 Hz signal, this signal being from a cathodic protection circuit as shown in FIG. 4 and emanating from current flow through underground conductor 40 and a series of anodes or anode terminal members 44 connected to it and placed along pipe 42. A D.C. signal with a 120 PPS ripple is applied between conductor 40 and pipe 42.

Sensor 14 of receiving unit 17 employs a 120 Hz resonant circuit consisting of antenna coil 20, located in housing region 22, and parallel connected capacitor 252. One side of this resonant circuit is grounded, and the other side is connected through resistor 254 and capacitor 256 and resistor 258 to the inverting input of amplifier 260. Adjustable attenuation of the received signal is provided by variable resistor 262, typically set to selectively attenuate the signal by 6 db. Attenuation is selectively switched by NPN transistor 264, the collector circuit of which is connected in series with variable resistor 262 to the high side of the output of antenna coil 20, and the emitter of this transistor is connected to ground. Transistor 264 is controlled by the operation of switch 100a in a like sequence to that in which transistor 64 and 58 effect the removal of the 6 db attenuation provided by resistors 56 and 54 of attenuator 52 in the 480 KHz circuit. Thus, initially, with switch 100a in the a position, leads B and K have a zero potential on them which is inverted to a high state by inverter connected NAND gate 276, and this high state is applied through resistor 267 and across resistor 266 to the base input of transistor 264. In this state, transistor 264 is turned on and attenuating resistor 262 is inserted across the input signal effecting a 6 db attenuation. Then, upon the switching of switch 100a to the c position, the potential on leads B and K go high, and the base input on transistor 264 goes low, turning transistor 264 off and thus opening the attenuation circuit. As a result, the 6 db attenuation is removed, this being in a locate or distance measurement mode.

In the manner described, either the attenuated or non-attenuated input from 120 Hz sensing coil 20 is applied to the inverting input of amplifier 260. At the same time, the non-inverting input of amplifier 260 is held at signal ground by capacitor 268 but is otherwise biased with a positive bias through resistor 277 across resistor 270, being powered by connection to terminal a of switch 190. Capacitor 272 effects filtering and decoupling between several stages powered from the same source. Negative feedback resistor 274, connected from the output of amplifier 260 to the inverting input, sets the gain of this amplifier at approximately 150. The output of amplifier 260 is fed through capacitor 277 and resistor 278 across a portion of potentiometer 188 when switch 190 is in the c position, potentiometer 188 thus providing a selectable load across the signal output from amplifier 260 and thus functioning as a gain control for receiver 17. The signal is then fed through resistor 280 to an active type 120 Hz band pass filter 282 and then from filter 282 to amplifier 284. The amplified 120 Hz signal from amplifier 284 is fed through a voltage doubling rectifier circuit 286. This circuit, which is conventional, employs a charge capacitor 288 and diodes 290 and 292, capacitor 294, and resistor 296. Diode 298 finally couples the positive output of rectifier 286 to terminal 233. As indicated above, receiving units 15 and 17 are alternately employed and operation as between them would be selected by switch 190.

The output of terminal F in FIG. 1a, an adjusted D.C. signal, appears at like identified terminal F of FIG. 1b, and depending upon which of receivers 15 or 17 are energized by switch 190, there would appear on the non-inverting input of amplifier 300, across resistor 302, a positive voltage which is an adjusted function of the amplitude of a particular received signal, either 480 KHz or 120 Hz. The inverting input of amplifier 300 is connected to ground through resistor 304, and the output and inverting input are connected together through resistor 306 wherein the combination of resistors 304 and 306 set the gain of amplifier 300 to approximately 8. One output of amplifier 300 is supplied to D.C. controlled oscillator 316, being fed to the base input of NPN transistor 308 which functions as a variable resistor which decreases in resistance as a function of the D.C. voltage output of amplifier 300, which in turn is a direct function of the signal being received. The variable resistance provided by transistor 308 together with the capacitance of capacitor 310, resistor 312, and capacitor 314 determine the frequency of oscillation of oscillator 316, the active element of which is operational amplifier 318, and the frequency determining elements just mentioned are connected to the inverting input of the operational amplifier as shown. A fixed bias of +9 volts is connected across a voltage divider consisting of resistors 320 and 322 with the midpoint of these resistors connected to the non-inverting input of operational amplifier 318.

A square waveform of oscillator 316 is obtained by the positive feedback circuit from the output of amplifier 318 through capacitor 324 and reverse connected diodes 326 and 328 connected together in parallel but in series with capacitor 324, then through resistor 330 and across resistor 322. Thus, voltage inputs, both positive and negative, are connected to the output of amplifier 318. The square wave output of oscillator 316 appears at terminal 332, as an available signal, and then through resistor 336 and across capacitor 338 to the base inputs of a pair of complementary transistors 340 and 342 which basically operate as switches of switching circuit 343 to selectively pass the oscillatory output of amplifier 316. This output ranges in frequency from approximately 30 KHz with essentially 0 input level to approximately 300 Hz with an applied level of approximately 0.6 volts. Thus, as one approaches an emitting structure and the signal strength increases, the operator observes a decrease in tone, the amplitude remaining essentially constant.

Switching circuit 343, normally turned on, supplies the audio output of oscillator 316 through capacitor 346 to the primary 352 of output transformer 348. The secondary 354 of transformer 348 is connected to loudspeaker 356 which reproduces the output of oscillator 316. A tapped lead 355 on the primary of transformer 348 connects to ground.

Switching circuit 343 employs complementary transistors 340 and 342 connected with their collector circuits in series with +9 volts from terminal 67 and filtered by capacitor 351. A stabilizing capacitor 341 is connected between the emitters and bases of these transistors. The input of switching circuit 343 is applied to the base inputs of transistors 340 and 342, and the output of the switching circuit is connected from the common emitter connection of these transistors through capacitor 346 to the primary 352 of transformer 348, a tapped lead 355 of the primary being connected to ground. The switching circuit is normally controlled by, and replicates, the oscillating output of amplifier 318 going between a high state and low state at the oscillating frequency of oscillator 316. When the output of amplifier 318 is high, transistor 340 is turned on and transistor 342 is turned off. During this period, there is a current flow between bias terminal 67 through transistor 340 and primary 352 of transformer 348 which charges capacitor 346. Next, when the output of amplifier 318 reverses, and the input of the bases of transistors 340 and 342 goes low, transistor 340 is turned off and transistor 342 is turned on. This thus causes a reverse current flow which discharges capacitor 346 through transistor 342 and the primary 348 of transformer 352. In this manner, transformer 348 is powered at the signal frequency of amplifier 318, and it in turn powers loudspeaker 356 and reproduces the output of amplifier 318.

The normal operation described above prevails except when a low impedance state is imposed on lead 353, thereby preventing the oscillatory signal from going high and switching circuit 343 operating at the oscillatory signal rate. A low impedance state, and thus turn-off of switching circuit 343, is effected by either 10 Hz oscillator 357 of control circuit 359 (in the search mode) or by depth-distance circuit 400 (in the depth-distance locating mode). When one of these sources of low impedance effects such, obviously, the signal output of loudspeaker 356 is turned off, signalling the operator of a circuit condition as will be explained below.

During the search mode of operation, switching circuit 343 would operate normally as described but is automatically turned on and off at a 10 Hz rate by 10 Hz oscillator 357 in the event that gain control potentiometer 188 is set to high to cover the operative tonal range of oscillator 316, and thus the operator should reduce circuit gain by operation of gain control 188. Amplifier 360 is the first stage of control circuit 359, and its non-inverting input is connected to the output of amplifier 300 and is thus provided a sample of the level of the adjusted received signal. A reference signal level, representative of a signal above which oscillator 316 may be overloaded, is provided to the inverting input of amplifier 360 by a voltage divider consisting of resistor 362 and resistor 364 and stabilized by capacitor 366 connected across resistor 364 and between the inverting input of amplifier 360 and ground. By this circuit, an overload state is indicated at the output of amplifier 360 by the signal on the non-inverting input going higher than the reference signal and thus producing a positive signal on the negative terminal of diode 363, the positive terminal of which is connected to the inverting input of amplifier 378 of 10 Hz oscillator 357.

The role of control circuit 359 is to selectively control the input impedance of the inverting input of amplifier 378 as amplifier 378 will produce oscillation of oscillator 357 when the impedance of this inverting input is high; otherwise, oscillation is blocked. Further, there is the circuitry constraint that oscillator 357 is only operational during the search mode. Thus, during the second mode of operation of the system, a depth-distance mode, means are provided to prevent the impedance on the inverting input of amplifier 378 from going high. Transistor 367 is employed for this role, it having its collector connected through lead 365 to the inverting input of amplifier 378, its emitter connected to ground, and its base connected through resistor 369 to lead K and through resistor 379 to +9 volt bias terminal 67. Thus, in the search mode, with switch 100a in the a position, lead K is at ground potential, transistor 367 is cut off, and a high impedance presented to the inverting input and thus the potential on the inverting input of amplifier 378 would normally be high. That is, it will be high in the event that diode 363 is non-conductive, which will be the case when, as described, the output of amplifier 360 goes high upon the occurrence of an overload state. Otherwise, the output of amplifier 360 would be low, making diode 363 conductive, holding the impedance of the inverting input of amplifier 378 low, and thus holding off oscillator 357.

When a high impedance state does prevail at the inverting input of amplifier 378 (when an overload state appears during the search mode), a combination of the values of capacitor 370 and the inverting input connected to resistor 372 produce oscillation of oscillator 357; and they, of course, are chosen to effect the stated oscillation of approximately 10 Hz. A voltage is provided to the positive non-inverting input of amplifier 378 by the combination of resistors 374, 376, and 380 necessary for self-starting of oscillator 357. During oscillations, the output level of amplifier 378 is varied between a high state and zero.

On one half cycle of oscillation, the output of amplifier 378 is pulled down to zero, and the voltage on lead 353 is pulled down through diode 350 and transistors 340 and 342 effectively block signal flow and thus interrupt reproduction of the output frequency of oscillator 316 by loudspeaker 356 at the 10 Hz rate. When this occurs, the operator is alerted that the signal level is excessive for full range operation of oscillator 316 and to reduce gain, this being by adjustment of potentiometer 188. When this is accomplished, amplifier 360 is turned off, and thereby the output of oscillator 316 is again continuously reproduced by loudspeaker 356, signalling that the search mode is properly operating.

The search mode is employed to locate a point on the ground above a buried structure, with the tone frequency of signal decreasing with increased level of radiation received by antenna coil 18 as it is approached. Upon locating this point, it is then often desirable to determine how deep underground the structure is located. When this is the case, depth-distance circuitry 400 is employed.

Depth determination of a buried structure is initialized by resting antenna coil 18 (in housing 22) on the ground or other surface. When this is done, the signal level will increase and the tone will decrease in frequency. The operator will then adjust gain control 188 until the tone frequency changes to mid-range level. As on result, the D.C. level of the output of amplifier 300 will be fed, through switch 100b and resistor 402 across capacitor 404 which will store this voltage as a reference level and apply it to the inverting input of unity gain amplifier 406. This amplifier is powered from +9 volt terminal 67 through diode 405 and across filtering capacitor 407. Next, and to commence the depth measurement procedure, switches 100a–100b are moved to the c position which opens the circuit to storage capacitor 404, boosts the signal by 6 db, and applies it through resistor 408 and across stabilizing capacitor 409 to the non-inverting input of comparator 410. Resistor 411 is connected between the output and non-inverting input of comparator 410. This signal boost is effected by attenuation control 70 which causes the turn-on of transistor 58, thus shorting the otherwise 6 db attenuating resistance in the circuit. The resulting increased signal decreases the resistance of transistor 308 and causes the frequency of oscillator 316 to decrease.

At the same time, the output of unity gain amplifier 406, representing the voltage level on capacitor 404, is applied to the inverting input of comparator 410 along with the present or real-time signal. Before proceeding with the comparison process, it is important that the stored signal level on capacitor 404 be within circuit limits for the comparators of the circuit if accuracy of depth measurement is to be achieved, and this level is tested by elements of depth circuit 400 as follows. The sample of the stored signal on capacitor 404 is supplied from unity gain amplifier 406 to the inverting input of comparator 412. Initially, with switches 100a and 100b in the a position, transistor 414 is held off by its base input being low, it being coupled to lead K through resistor 416 and to +9 volt terminal 67 through resistor 379. As a result, there will be a full 5 volts on the non-inverting input of comparator 412 since there will be no current through resistors 418 and 420. As a result, the output of comparator 412 will remain high and thus have no switching effect on switching state 343. However, as soon as switches 100a–100b are switched to the c position, transistor 414 is switched on, causing resistors 418 and 420, in series with the collector circuit of transistor 414 and +5 volt terminal 195, to assume a voltage divider role and causing the voltage input on the non-inverting inputs of comparators 412 and 446 to be reduced to a reference level. In the event that the sample signal on capacitor 404 is higher than the reference signal, the output of comparator 412 would go low, causing the signal on lead 353 and on the base inputs of switching transistors 340 and 342 to go low, cutting off tone signal flow through these transistors and thus cutting off the sound output of loudspeaker 356. This signals that an excessive signal level was sampled and thus indicating to the operator that a new and lower level sample should be taken. This is accomplished by operating switches 100a–100b back to an a position, adjusting potentiometer 188 to a lower gain setting and then moving switches 100a-100b back to a c position.

Assuming that the system has been properly reset with a sample level below the reference level, the next step would be to effect a depth measurement. This is accomplished by gradually raising antenna coil 18, this being until the received signal level supplied to the non-inverting input of amplifier 410 equals the sampled level on the inverting input. When this occurs, the output of comparator 410 will go to zero. Since it is applied to the non-inverting input of comparator 412, its output will go low and thus provide a zero signal on lead 353 which would be applied to the base inputs of transistors 340 and 342 and cutting them off and thus interrupting the sound. When this occurs, the operator is signalled that the distance above ground of antenna coil 18 is equal to the distance below ground to the buried or concealed structure. He would then measure this. The equivalency follows from the fact that the measured signal was increased in level by 6 db from the reference level (with the antenna coil on the ground), but now the signal levels are equal. This means that the transmission distance is doubled, half of which is above ground and half below.

The process just described must be effected in a reasonably short period, for example, 60 to 90 seconds, in order to be certain that the stored voltage on capacitor 404 has not leaked significantly. In order to prevent an inaccurate indication because of such an occurrence, timing circuit 430 times the period of the depth measurement process, commencing from the time that switch 100a-100b has been moved from its a position to its c position. Timing circuit 430 employs comparator 432 which has its inverting input connected through resistor 434 to +5 volt terminal 436 and its non-inverting input connected to lead K. Initially, and before switching to the c position, there is a low, 0, level on lead K which is applied to the non-inverting input of comparator 432. In this posture, comparator 432 then provides through resistor 438 a zero level across capacitor 440. Upon the switching of switch 100a to a c position, the voltage on lead K and the non-inverting input of comparator 432 goes high, overcoming the reference bias applied to the inverting input and the output of comparator 432 goes high. This then enables capacitor 440, connected to resistors 442 and 448 and to the inverting input of comparator 446, to commence charging through resistor 442. The value of this resistor, together with the value of capacitor 440, is set to cause the voltage across capacitor 440 to rise to a selected level, the bias voltage on the non-inverting input, in a selected time, e.g., 60 to 90 seconds. When this level is reached, the output of capacitor 440, being applied to the inverting input of comparator 446, causes the output of comparator 446 to go low. This then applies a low or blocking signal on lead 353 to the base of transistors 340 and 342, blocking sound output to loudspeaker 356. The operator will thereby be signalled that the process of depth measurement has gone on too long and that he must start over. This process can be readily tested by moving antenna coil 18 downward, which normally should cause a signal to reappear. If it does not, it is clear that the '37 safe" time has expired. In the event that this is the case, it becomes necessary to switch switches 100a-100b back to an a position which will discharge capacitor 440, then move the switches back to the c position and go through the procedure again.

While the operation of applicants' system has generally been described in the foregoing description of the system, the sequences they involve, which are somewhat complex, will be reviewed as they would typically occur in usage of the system. First, with transmitter 26 positioned relatively close to the buried structure to be traced and thereby its 480 KHz signal inductively coupled to it, receiver 10 would, at some point removed from the transmitter, be employed to locate a point just above the structure and its depth below ground. During the "search" or locate mode, switches 100a-100b and 102 are both set to the a position. In this position, there is in place the 6 db attenuation enabled by resistor 54, 56, and 172. The gain of amplifiers 180 and 206 is set by potentiometer 188 to provide a D.C. output level to the non-inverting input of amplifier 300 such that this D.C. level produces a comfortable range of audible frequencies as an output of oscillator 316 and as reproduced by loudspeaker 356. Oscillator 316 is such that it provides its highest frequency without an input signal, and the input signal goes lower as the received signal increases in amplitude, the frequency dropping down to approximately 300 Hz at a selected maximum level. As the operator moves the receiver's antenna coil 18 closer to the structure being sought, the audio frequency thus goes lower as he approaches it and will be lowest when the antenna is directly over the structure. Since the audio output power is relatively constant over its entire frequency range, the operator need listen only to changes in tone, or frequency, which changes are, of course, must easier to perceive than changes in amplitude. In the event that the level rises too high for the range of oscillator 316, oscillator 357 produces interruptions of the tone signal at a 10 Hz rate, signalling the operator to lower the gain.

After having located a point just above a structure and it is desired to determine its depth, the operator positions the device such that antenna 18 rests on the ground or surface cover. While there, the signal level as it appears at the output of amplifier 300 is applied through switch 100b and terminal a to capacitor 404 which charges to the level of this voltage as a reference level reflecting the intensity of the signal received from the underground structure 28, an unknown distance below where antenna coil 18 is positioned. At this point, switches 100a-100b are switched to a c position, and to prevent operation with the receiver gain too high, the stored level is compared with a safe reference level. If it is too high, this fact is signalled by a tone cut-off. Similarly, in the event that the process of depth measurement continues beyond a selected period, for example, 60 to 90 seconds, the tone output is interrupted.

Assuming that levels are correct and that an excessive time has not been utilized for the depth measurement, the receiver is raised until the signal level output of amplifier 300 is equal to or slightly lower than the reference voltage on capacitor 404. At this point, sound cuts off and the distance from the antenna and surface is equal to the distance from the surface to the radiating structure, and thus it can be easily measured by the operator.

The same technique employed to determine the depth of a structure may also generally be used in determining discontinuities in a longitudinally running concealed structure. Thus, there might be a substantial crack in a fluid line under a roadway or building, and the point source of leakage may be otherwise difficult to determine. Alternately, there may be a break or short circuit of a cathodic protection system. After locating the structure, the operator rests the antenna on the surface and established, by adjustment of gain control 188, a reference signal level which produces a tone of somewhat higher frequency than the lowest attainable frequency. A D.C. signal representative of this is then stored on capacitor 404. Next, switches 100a–100b are switched to the c position, which immediately causes the signal, now applied to comparator 410, to increase in level by 6 db and, accordingly, the tone frequency output of loudspeaker 356, immediately goes lower. As the device is moved along the path of the structure, the signal will slowly reduce as one moves away from the point where the signal is injected from transmitter 26. When the new signal becomes equal to or slightly less than the reference voltage on capacitor 404, comparators 410 and 412 switch so that the output of comparator 412 goes low, switching off switching circuit 343 and stopping the sound. The operator then observes the distance that was traveled between the point where the reference voltage was established and where the sound shuts off. The foregoing procedure is repeated, commencing with the adjustment of gain control 188 as described above and the distance interval covered in each instance before cut-off is noted. As a break or discontinuity is approached, the distance intervals become shorter and shorter. As the break is passed, the intervals will start to increase. The operator then determines the break or discontinuities within the two intervals designated by the last decreasing interval and the first increasing interval. This is where the greatest change in attenuation occurs. The operator can reduce the distance of an interval by repeating the procedure but selecting a lesser degree of attenuation as by the selection of one of the other attenuation, for example, the 3 db or 5 db attenuation of attenuator 52 as described above. This increases the resolution of the system. Once the operator determines the interval containing the break or discontinuity, he would move the signal source to the other side of the break and repeat the procedure as a verification process.

The operation of the cathodic fault detection portion of the present invention is examined with reference to FIG. 4. While cathodic protection systems may take different forms insofar as the placement of the auxiliary conductor with respect to the pipe or other structure to be detected is concerned, in general, the system shown in FIG. 4 is illustrative of the functioning of such systems. As shown, to counteract this, a direct current source having a 120 PPS ripple is connected to electrical lines or terminals 46 and 48 with the negative terminal conneced to pipe 42 and the positive terminal connected to conductor 40. A typical problem experienced with such a system is that of a break or short circuit to ground somewhere along conductor 40, say, at point 41 whereby cathodic protection for pipe 42 would be interrupted and thus be incomplete along pipe 42. The present system would accurately locate such a break.

To operate receiver 10 in the cathodic protection system fault detection mode, switch 190 would be operated whereby moveable terminal 191 would be moved to the a position and movable terminal 193 to the c position. In this manner, the circuitry of receiving unit 17 is powered and gain control 188 is connected to control gain of receiving unit 17. Receiving unit 17 will now respond to 120 Hz signals, these being impressed on antenna coil 20 and applied to the inverting input of amplifier 260, initially in the search mode as in the case for operation described for receiving unit 15. Switch 100a is positioned in the a position for the search mode. In this mode, it will be noted that the potential on lead K is applied through inverter connected NAND gate 276 and resistor 267 to the base input of transistor 264. As a result, the initial low state of lead K, from switch 100a being in the a position, is inverted to a high state which then turns on transistor 264 and places 6 db attenuating resistor 262 in circuit. This causes the received signal on antenna coil 20 to be attenuated by this amount and then applied through capacitor 256 and resistor 258 to the inverting input of amplifier 260. As amplified and filtered by receiving unit 17, the signal is applied to rectifier 286 and then as a D.C. level is fed to terminal F and applied to the input of amplifier 300. As in the case with a 480 KHz derived signal, gain control 188 is adjusted such that D.C. control oscillator 357 provides a responsive signal as receiver 10 is moved, and thus as the receiver is moved toward conductor 40 or pipe 42, the tone output reproduced by loudspeaker 356 will go lower in tone. The lowest tone, for example, marks when receiver 10 would be on the surface above one of these structures. Next, with antenna coil 20 of receiving unit 17 resting on the surface or near it and above a structure, the D.C. level from amplifier 300 will be stored on capacitor 404 in the same manner as earlier described. Next, switches 100a–100b are switched to the c position whereupon the now high state on lead K is inverted to a low state, causing transistor 264 to switch out attenuating resistor 262 and cause the signal level at the output of amplifier 300 to rise and be applied to the non-inverting input of comparators 406 and 410. This, of course, will also lower the tone output signal. If depth is desired, the procedure for depth finding as described above would be followed. If the location of a defect is desired, such as a break 41 in conductor 40, the following routine would be observed. Receiver 10 would trace along the path of conductor 40. This process is continued, moving away from the source of the applied 120 Hz bias until the signal can no loner be picked up. This means that we have arrived in the vicinity of the last attached anode, anode 44c. At this point, the system is switched to operate in the 480 KHz mode, and the process described above for its use in locating discontinuities in a continuous structure is followed.

FIG. 5 illustrates an alternate arrangement for depth-distance measurement to that shown in FIG. 1b. As described above, the function involved is that of the determination of the depth of a structure or the location of a break in a continuous metallic structure as, for example, a break in a cathodic protection bias line. Instead of making comparisons of amplitude levels and detecting when two are identical by the employment of comparators, frequency outputs of D.C. controlled oscillator 36 are compared, this being accomplished by tone decoder 450, e.g., a type 567, and the pin connections for this model are shown. The frequency response of it is determined largely be capacitors 452 and 454 and resistors 456 and 458, resistor 458 being made adjustable for fine tuning. These circuit elements are connected to the decoder pin connections as shown. A signal input is obtained by connecting pin 3 through capacitor 460 to terminal M on FIG. 1b, which is the output of D.C. controlled oscillator 316. Locate-distance circuit 400 would not be employed, either by breaking leads 464 and 466 or by open switches (not shown) in these leads.

So long as the signal input to decoder 450 is different from its tuned frequency, the output of decoder 450, on pin 8, provides a low, essentially zero, output. When, however, the input frequency is equal to the frequency set in by the adjustment of resistor 458, the output of pin 8 will go higher, to essentially 5 volts D.C. In the present application, decoder 450 would be typically tunable in the range of 500 to 1,000 Hz by the adjustment of resistor 458.

The D.C. output on pin 8 of decoder 450 is fed through resistor 468 to the base of NPN transistor 470, its emitter being grounded and its collector connected to terminal J of FIG. 1b. Single pole, double throw switch 472 has its movable terminal 474 connected to ground and to the emitter of transistor 470. Throw position a of switch 472 is connected to the base of transistor 470, and throw position b is simply left open. Position a is the search mode for the system, and position b is the calibrate and depth-distance measurement position of switch 472. Thus, during the search mode, as described above, the output of decoder 450, an input to transistor 470, is grounded, and thus transistor 470 would remain off and have no effect on the operation of transistor switches 340 and 342, which function normally to provide the output of D.C. controlled oscillator 316 to loudspeaker 356.

When an object is located by employment of the system in the search mode, and with switch 100a still in the a position, receiver 10 is positioned with antenna coil 18 adjacent the earth (or other surface) as shown in FIG. 2, and gain control 188 is operated such that the frequency of oscillator 316 would be set to some frequency between 500 and 1,000 Hz. Next, switch 472 would be switched to the b position, and resistor 458 would be adjusted until a voltage appeared at the output of decoder 450, which voltage would then trigger the input of transistor 470, apply a low state of lead J, and cut off the output of voltage controlled oscillator 316 to loudspeaker 356. In this manner, the operator is signalled that decoder 450 has been set to respond to the existing frequency. It is unimportant what it is, but we will assume that it is 700 Hz. Next, switch 100a would be switched to the c position, which will cause attenuator 52 to be operated to short the 6 db resistance inserted by resistors 56 and 54, and thus raising the signal level at the output of amplifier 300. This lowers the frequency of output of D.C. controlled oscillator 316 to some lower frequency, at which point decoder 450 will no longer respond and its output will become zero, causing transistor 470 to go low and turning back on transistors 340 and 342, which will again feed the output of the now lower frequency of oscillator 316 to loudspeaker 356.

Next, sensing coil 18 would be raised above ground by lifting of receiver 10. Sensing coil 18 would be slowly raised until the sound output of loudspeaker 356 cuts off. This signifies that the frequency of output of oscillator 316 has again reached the tuned setting of decoder 450 (700 Hz) and that decoder has operated transistor 470 on and transistors 340 and 342 off. This will, of course, have occurred when sensing coil 18 has been raised a distance sufficient to balance the increase 6 db of signal strength which has been inserted. Accordingly, the distance between the surface (e.g., earth) and sensing coil 18 is an indication of the distance below the surface of the structure from which the radiation occurs.

In the same manner as described above, this circuit can also be employed to relate distances along a structure to known inserted attenuations of signal as an aid to the determination of a break or other defect in an underground conductor as described above.

By substitution of the circuitry of FIG. 5, there is eliminated a need for a depth-locate circuitry to include means for the detection of excessive signal levels and excessive processing time as in the case of locate-distance circuit 400. The former is implicitly no longer a problem, and the latter is basically unnecessary since the circuitry adjustments of tone decoder 450 will remain relatively constant over extended periods.

From the foregoing, it is to be appreciated that the applicants have provided a significantly improved device for the lateral and vertical location of hidden structures. The same instrument enables such detection utilizing either emissions from a cathodic protection system or emissions received as a result of the induction or injection of RF currents from an auxiliary transmitter. Depth location, which has particularly been a most inexact technique, has been radically improved, as has the location of discontinuities.

We claim:

1. A system for locating a concealed conductive structure comprising:
    means for impressing a periodic electrical signal on a said concealed, conductive structure from which said signal is reradiated;
    sensing means, movable from one position to another and at different distances from a surface of concealment of a said concealed structure, for sensing said periodic signal and providing an output signal which varies with the sensed amplitude of said periodic signal;
    first signal means having an input and output, and said input being responsive to said output signal of said sensing means and including level changing means for selectively effecting (a) one factor of change in level between said input and output and providing a first signal output, or (b) a selected multiple of said one factor of change between said input and output and providing a second signal output;
    detection means responsive to said first and second signal outputs and including:
        (a) reference means responsive to said first signal output for providing a first, reference, signal under conditions of said sensing means being positioned adjacent said surface of concealment;
        (b) second signal means responsive to a said second signal output for providing a second signal under conditions of said level changing means effecting a said selected multiple of said one factor of change, and
        (c) comparison means responsive to said first and second signals for providing a selected output signal state when there is a selected relation between said first and second signals;
    whereby, with said sensing means being moved away from said surface of concealment, a position is reached wherein said second signal bears a selected relation with said first signal, and the then distance between said sensing means and said surface is a distinctive factor of the distance of said structure from said surface, and thus the latter distance is calculatable; and
    indicating means coupled to said comparison means and responsive to said selected output signal state for indicating the occurrence of said selected relation.

2. A system as set forth in claim 1 wherein said indicating means includes:
  a D.C. controlled oscillator having an input coupled to said signal output of said first signal means and having an audio frequency output; and
  audio reproduction means coupled to said audio frequency output for providing an audio signal which varies in frequency as a function of said signal output of said first signal means.

3. A system as set forth in claim 2 wherein said indicating means includes switching means responsive to said selected output signal state of said comparison means for interrupting said audio signal.

4. A system as set forth in claim 3 further comprising third signal means responsive to said signal output of said first signal means for providing a third signal indicating that the level of said last-named signal output is greater than a predetermined level and that it should be adjusted downward.

5. A system as set forth in claim 1 wherein said comparison means provides an output when said first and second signals are alike in at least one characteristic.

6. A system as set forth in claim 5 wherein said selected relation is equivalence in amplitude.

7. A system as set forth in claim 6 wherein said first and second signals are D.C. signals.

8. A system as set forth in claim 7 wherein said reference means comprises a capacitor upon which the level of said first signal is stored and is applied as said first signal to said comparison means pending receipt of said second signal by said second signal means.

9. A system as set forth in claim 8 further comprising means responsive to the level of a signal stored on said capacitor for signalling when said last-named signal is above a selected, circuit overload, state.

10. A system as set forth in claim 9 further comprising means responsive to the time of storage of said last-named signal on said capacitor for signalling when the period of time exceeds a selected period.

11. A system as set forth in claim 10 wherein said means for signalling includes:
  a D.C. controlled oscillator having an input coupled to said output of said first signal means;
  audio reproduction means coupled to the output of said D.C. controlled oscillator for reproducing the output of said D.C. controlled oscillator; and
  means responsive to an excessive level or excessive time of storage of said first signal on said capacitor for interrupting the reproduction of said audio reproduction means.

12. A system as set forth in claim 1 wherein said sensing means includes selective means for sensing as one said electrical signal, a radio frequency signal, and as a second electrical signal, a power line related frequency signal, and said first signal means includes means for providing an output signal which is a function of the amplitude of the selected one of said electrical signals.

13. A system as set forth in claim 1 wherein said first signal means includes means for selectively varying signal levels by a plurality of selected precise values and including indicating means for indicating the selected one of said plurality of selectable precise values.

14. A system as set forth in claim 1 wherein said first signal means includes means for varying a signal level by a precise 6 db.

15. A system as set forth in claim 1 including switching means for alternately, in a first, search, mode, interrupting said indicating means, and in a second, locate, mode, enabling said indicating means.

16. A system as set forth in claim 8:
  wherein said comparison means includes a first input coupled to said capacitor upon which appears said first signal and a second input upon which appears said second signal, and said comparison means includes means for comparing the signals at said first and second inputs; and
  said system comprising switching means including a first switch mode for coupling said first signal from said first signal means to said capacitor and a second switch mode for connecting said second signal output from said first signal means to said comparison means as said second signal, whereby a signal level of said signal output of said first signal means may be stored on said capacitor as said first signal for the condition when said sensing means is on the surface above a buried structure and compared with a varying signal, as said second signal, as said sensing means is raised above the surface.

17. A system as set forth in claim 16 wherein said switching means includes means coupled to said first signal means for switching between a plurality of said multiples of said one factor of change between said input and output.

18. A system as set forth in claim 16 wherein said multiple of one factor of change between said input and output is 6 db when switching is from said first mode to said second mode.

19. A system as set forth in claim 5 wherein said first and second signals are alike in frequency.

20. A system as set forth in claim 4 wherein said switching means is further responsive to and operated by said third signal of said third signal means.

21. A system for measurably relating signal levels and distances with respect to a concealed conductive structure comprising:
  means for impressing a periodic electrical signal on a concealed, conductive structure from which said signal is reradiated;
  sensing means, movable from one position to another and at different distances from a surface of concealment of a said concealed structure, for sensing said periodic signal and providing an output signal which varies with the sensed amplitude of said periodic signal;
  first signal means having an input and output, and said input being responsive to said output signal of said sensing means and including level changing means for selectively effecting (a) one factor of change in level between said input and output and providing as an output a first signal, or (b) a selected multiple of said one factor of change between said input and output as a second signal; and
  detection means responsive to said first and second signal outputs for providing a selected signal state when there is a selected relation between said first and second signals;
  whereby, with said sensing means being moved through a distance to effect a selected factor of change in signal level, the measurement of this distance is indicative of the location of a discrete region of said structure, location of a region of discontinuity or location of structure in terms of location of sensing means.

22. A system as set forth in claim 21 wherein said detection means comprises:

a D.C. controlled oscillator having an input coupled to said output of said first signal means and an audio range frequency output signal;

audio reproduction means coupled to said output signal of said D.C. controlled oscillator for producing said output signal;

switching means responsive to a selected signal state for interrupting reproduction by said audio reproduction means; and frequency responsive means coupled to said audio frequency output signal for providing to said switching means said selected signal state upon the occurrence of a selected audio frequency signal.

23. A system as set forth in claim 21 wherein said frequency response means comprises a tone decoder.

* * * * *